(12) United States Patent
Ikeda et al.

(10) Patent No.: US 11,407,465 B2
(45) Date of Patent: Aug. 9, 2022

(54) STRADDLE-TYPE ELECTRIC VEHICLE

(71) Applicant: HONDA MOTOR CO., LTD., Tokyo (JP)

(72) Inventors: Tsugio Ikeda, Wako (JP); Katsuhiko Sato, Wako (JP); Makoto Fujikubo, Wako (JP); Takumi Furuto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 17/029,772

(22) Filed: Sep. 23, 2020

(65) Prior Publication Data

US 2021/0001943 A1 Jan. 7, 2021

Related U.S. Application Data

(63) Continuation of application No. PCT/JP2018/013427, filed on Mar. 29, 2018.

(51) Int. Cl.
*B62J 17/10* (2020.01)
*B62J 41/00* (2020.01)
(Continued)

(52) U.S. Cl.
CPC ............... *B62J 17/10* (2020.02); *B62J 1/08* (2013.01); *B62J 41/00* (2020.02); *B62J 43/16* (2020.02);
(Continued)

(58) Field of Classification Search
CPC .............. B62J 17/10; B62J 41/00; B62K 7/02
(Continued)

(56) References Cited

U.S. PATENT DOCUMENTS 8,783,405 B2 *  7/2014  Irie ................. B62K 11/04
                                                   180/312
8,973,697 B2 *  3/2015  Matsuda ........... B62K 11/04
                                                   474/93
(Continued)

FOREIGN PATENT DOCUMENTS

CN          1300693 A       6/2001
CN        103155381 A       6/2013
(Continued)

OTHER PUBLICATIONS

Chinese Office Action for Chinese Patent Application No. 201880091066.2 dated Nov. 25, 2021 (partially translated).

(Continued)

*Primary Examiner* — Kevin Hurley
*Assistant Examiner* — Hosam Shabara
(74) *Attorney, Agent, or Firm* — Thomas | Horstemeyer, LLP

(57) ABSTRACT

A straddle-type electric vehicle, comprising a pair of left and right main frames, a seat rail extending rearward from a rear portion of each of the main frames, a pivot frame extending downward from a rear portion of each of the main frames, a swing arm supported by the pivot frame and by which a rear wheel is swingably supported, a battery arranged in a space between the main frames, a power unit arranged in the space and generates motive power based on electric power of the battery, and a wind guiding duct for guiding traveling wind to the space, the wind guiding duct provided relative to each of the main frames, the wind guiding duct being positioned more outward in a vehicle width direction than the main frames.

7 Claims, 7 Drawing Sheets

(51) Int. Cl.
  *B62J 43/16* (2020.01)
  *B62J 1/08* (2006.01)
  *B62M 7/02* (2006.01)
  *B62J 43/28* (2020.01)
  *B62K 11/04* (2006.01)
  *B62K 11/02* (2006.01)

(52) U.S. Cl.
  CPC ............... *B62K 11/02* (2013.01); *B62M 7/02* (2013.01); *B62J 43/28* (2020.02); *B62K 11/04* (2013.01); *B62K 2204/00* (2013.01)

(58) Field of Classification Search
  USPC ........................................................ 180/220
  See application file for complete search history.

(56) References Cited

U.S. PATENT DOCUMENTS

| | | | |
|---|---|---|---|
| 9,027,694 B2 | 5/2015 | Matsuda | |
| 9,160,214 B2 | 10/2015 | Matsuda | |
| 9,242,599 B2 | 1/2016 | Shimizu et al. | |
| 9,296,444 B2 * | 3/2016 | Matsuda | B62J 43/28 |
| 9,768,661 B2 * | 9/2017 | Matsuda | B62K 11/04 |
| 9,868,486 B2 | 1/2018 | Hagimoto et al. | |
| 9,941,556 B2 | 4/2018 | Testoni | |
| 10,252,637 B2 | 4/2019 | Yamamoto et al. | |
| 10,270,314 B2 | 4/2019 | Matsuda | |
| 2013/0256049 A1 | 10/2013 | Matsuda | |
| 2013/0270938 A1 | 10/2013 | Matsuda | |
| 2014/0015656 A1 | 1/2014 | Shimizu et al. | |
| 2016/0236748 A1 | 8/2016 | Matsuda | |
| 2016/0240900 A1 | 8/2016 | Testoni | |
| 2016/0280059 A1 | 9/2016 | Hagimoto et al. | |
| 2017/0282748 A1 | 10/2017 | Yamamoto et al. | |
| 2017/0282749 A1 | 10/2017 | Yamamoto et al. | |

FOREIGN PATENT DOCUMENTS

| | | |
|---|---|---|
| CN | 107284580 A | 10/2017 |
| DE | 102012211516 A1 | 5/2014 |
| EP | 1108585 A2 | 6/2001 |
| EP | 1108585 A3 | 11/2003 |
| JP | H05105147 A * | 4/1993 |
| JP | H07-323878 A | 12/1995 |
| JP | 2012086689 A * | 5/2012 |
| JP | 2012179987 A | 9/2012 |
| JP | 2016182916 A | 10/2016 |
| JP | 2016535388 A | 11/2016 |
| JP | 2017081486 A | 5/2017 |
| WO | 2012066601 A1 | 5/2012 |
| WO | 2012117807 A1 | 9/2012 |
| WO | 2015049711 A1 | 4/2015 |
| WO | 2015052647 A1 | 4/2015 |
| WO | 2019186952 A1 | 10/2019 |

OTHER PUBLICATIONS

International Search Report for PCT/JP2018/013427 dated Jun. 12, 2018.
PRP for PCT/JP2018/013427 dated Mar. 25, 2020.
Chinese Office Action for Chinese Patent Application No. 201880091066.2 dated Apr. 30, 2021.

* cited by examiner

US 11,407,465 B2

STRADDLE-TYPE ELECTRIC VEHICLE

CROSS-REFERENCE TO RELATED APPLICATION(S)

This application is a continuation of International Patent Application No. PCT/JP2018/0134127 filed on Mar. 29, 2018, the entire disclosure of which is incorporated herein by reference.

TECHNICAL FIELD

The present invention relates to a straddle-type electric vehicle.

BACKGROUND ART

PTL 1 describes a configuration of a straddle-type electric vehicle (electric two-wheeled vehicle) in which an electric motor device is cooled using traveling wind. According to PTL 1, traveling wind that has flowed in from an inflow port on a front portion of a vehicle body passes through the inside of a case of the electric motor device and then flows out from an outflow port on a rear portion of the vehicle body; as a result, the electric motor device is cooled.

CITATION LIST

Patent Literature

PTL 1: International Publication No. 2012/066601.

SUMMARY OF INVENTION

Technical Problem

Meanwhile, a predetermined power unit, such as an electric motor that generates motive power based on the electric power from a battery (e.g., a three-phase induction motor), is used for an electric motor device. One way to increase the travel distance of a straddle-type electric vehicle is to increase the capacity of a battery. The structure of PTL 1 has left room for structural improvement for realizing an increase in the capacity of a battery.

It is an object of the present invention to realize an increase in the capacity of a battery in a vehicle body structure of a straddle-type electric vehicle.

Solution to Problem

A first aspect of the present invention pertains to a straddle-type electric vehicle, comprising: a pair of left and right main frames that is installed so as to extend in a longitudinal direction of a vehicle body; a seat rail that is installed so as to extend rearward from a rear portion of each of the pair of left and right main frames a pivot frame that is installed so as to extend downward from a rear portion of each of the pair of left and right main frames; a swing arm that is supported by the pivot frame and by which a rear wheel is swingably supported; a battery that is arranged in a space between the pair of left and right main frames in a plan view; a power unit that is arranged in the space in a plan view and generates motive power based on electric power of the battery; and a wind guiding duct for guiding traveling wind to the space, the wind guiding duct being provided relative to each of the pair of left and right main frames, wherein the wind guiding duct is positioned more outward in a vehicle width direction than the pair of left and right main frames, wherein the power unit is supported in front of the pivot frame, and the straddle-type electric vehicle further includes an air outlet port that is provided between the power unit and the pivot frame so as to be capable of emitting the traveling wind to an area below the vehicle body.

Advantageous Effects of Invention

According to the present invention, the capacity of a battery can be increased in a vehicle body structure of a straddle-type electric vehicle.

DESCRIPTION OF EMBODIMENTS

Figure 1:
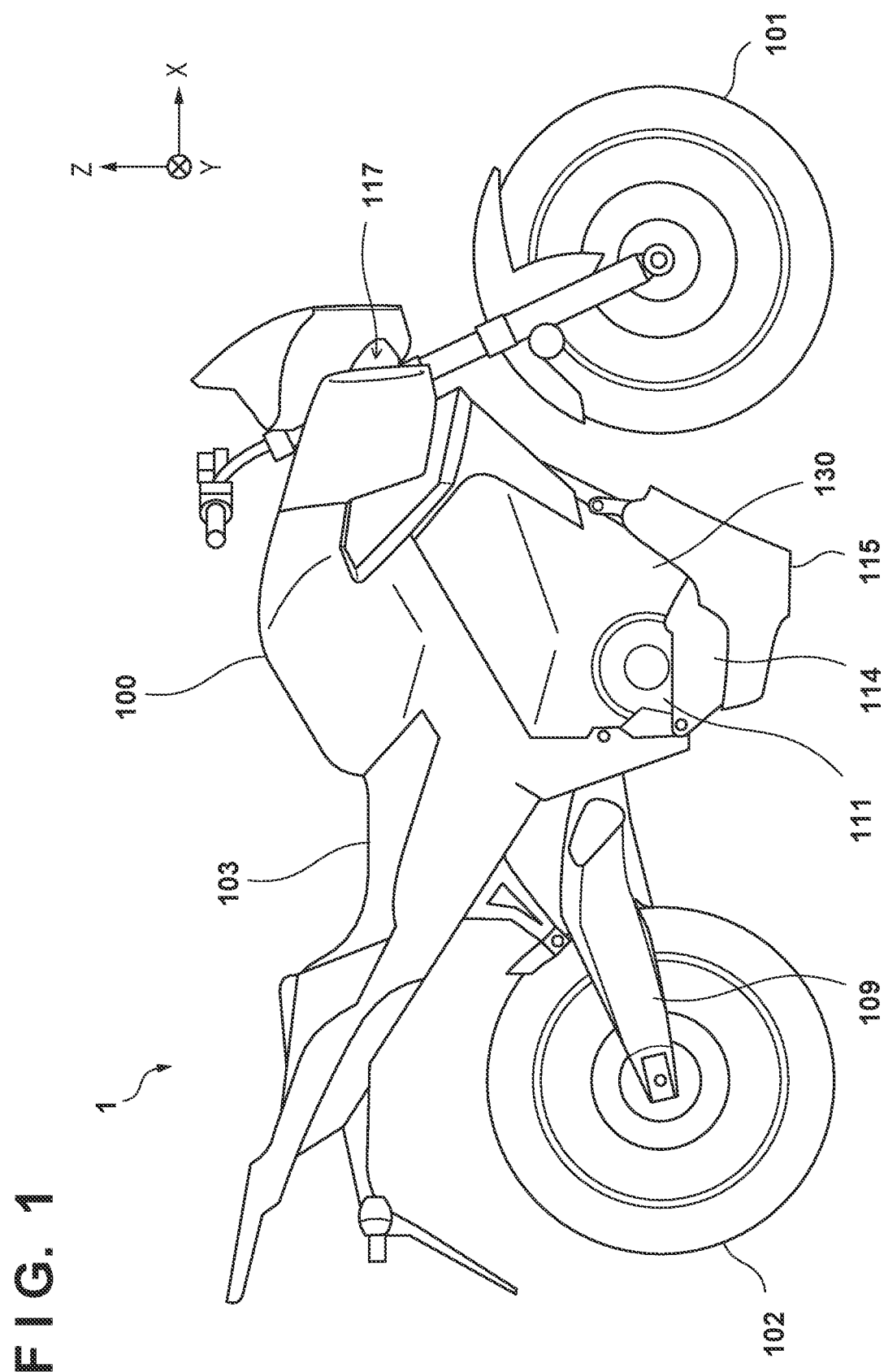
FIG. 1 is a left side view for describing a configuration of a straddle-type electric vehicle (two-wheeled vehicle).
Figure 2:
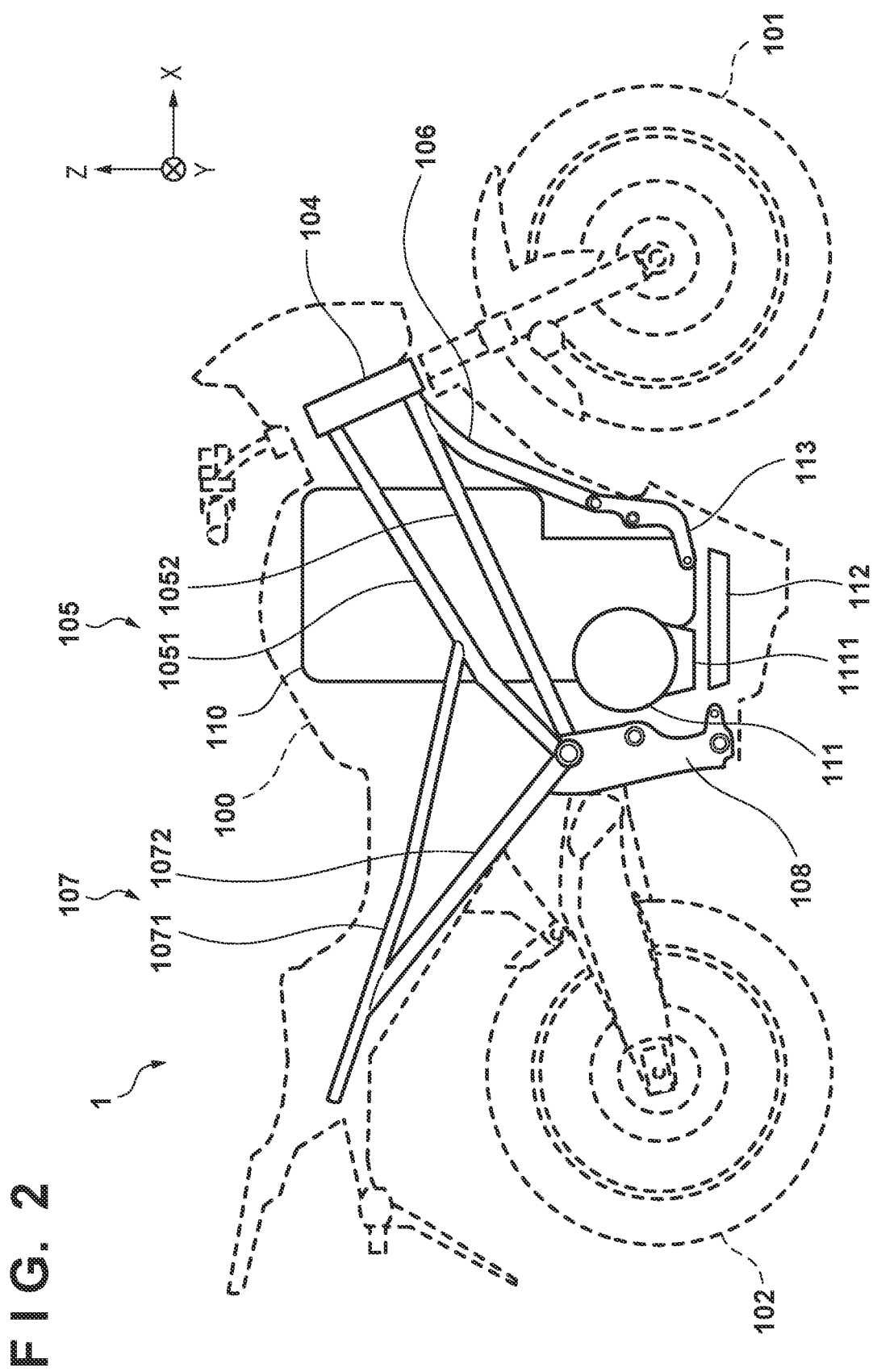
FIG. 2 is a left side view for describing an internal structure of a straddle-type electric vehicle.

Hereinafter, embodiments will be described in detail with reference to the attached drawings. Note that each drawing is a schematic diagram that shows a structure or a configuration of an embodiment, and the dimensions of each member shown do not necessarily reflect the actual dimensions. Furthermore, in the attached drawings, the same reference numerals are given to same or FIG. 1 is a left side view of a straddle-type electric vehicle 1 according to an embodiment. Also, FIG. 2 shows an internal structure, together with an outer shape, of the straddle-type electric vehicle 1. In the figures, in order to facilitate the understanding of the structure, an X-axis, a Y-axis, and a Z-axis that are perpendicular to one another are shown (the same goes for other figures that will be described later). The X direction corresponds to the longitudinal direction of a vehicle body, the Y direction corresponds to the vehicle width direction or the left-and-right direction of the vehicle body, and the Z direction corresponds to the up-and-down direction of the vehicle body. In the present specification, such expressions as front/rear, left/right (side), and up/down indicate relative positional relationships based on the vehicle body. For example, such expressions as "front" and "anterior to" correspond to the +X direction, and such expressions as "rear" and "posterior to" correspond to the −X direction. Similarly, such expressions as inward in the vehicle width direction (the inner side)/outward in the vehicle width direction (the outer side) also indicate relative positional relationships based on the vehicle body.

In the present embodiment, the straddle-type electric vehicle 1 is a motorcycle that a rider (driver) can ride by straddling a vehicle body 100, and includes a front wheel 101 and a rear wheel 102. A seat 103 on which the rider can be seated is provided on the vehicle body 100. In addition, the straddle-type electric vehicle 1 further includes a head pipe 104, main frames 105, down frames 106, seat rails 107, pivot frames 108, and swing arms 109 within the vehicle body 100. The main frames 105, down frames 106, seat rails 107, pivot frames 108, and swing arms 109 are provided as a pair on the left and right; this, however, is not shown because FIG. 1 and FIG. 2 are left side views. Note that the foregoing frames 105 to 108 may be collectively referred to as, for example, a vehicle body frame.

The head pipe 104 is arranged at the front of the vehicle body 100 in such a manner that a handle bar is turnably supported thereby, and the rider can perform a steering operation while changing the orientation of the front wheel 101 via a front fork by turning this handle bar.

The pair of left and right main frames 105 is installed so as to extend from the head pipe 104 in the longitudinal direction of the vehicle body while becoming distanced from each other in the left-and-right direction. In the present embodiment, the main frame 105 includes an upper frame portion 1051 and a lower frame portion 1052. A non-illustrated reinforcement member, such as a truss frame, may be mounted between the upper frame portion 1051 and the lower frame portion 1052; this can improve the strength of the main frame 105. In the present embodiment, the down frame 106 is installed so as to extend downward and rearward from a front portion of the lower frame portion 1052.

The seat rail 107 is installed so as to extend rearward from a rear portion of the main frame 105, and supports a load applied to the seat 103. In the present embodiment, the seat rail 107 includes an upper frame portion 1071 and a lower frame portion 1072. A non-illustrated reinforcement member, such as a truss frame, may be mounted between the upper frame portion 1071 and the lower frame portion 1072; this can improve the strength of the seat rail 107.

The pivot frame 108 is installed so as to extend downward from a rear portion of the main frame 105, the swing arm 109 is supported by this pivot frame 108, and the rear wheel 102 is swingably supported by the swing arm 109.

The straddle-type electric vehicle 1 further includes a battery 110, a power unit 111, and a control apparatus 112. As the battery 110, a chargeable secondary battery is used, examples of which include a lithium-ion battery, a nickel-hydrogen battery, and the like. The power unit 111 generates motive power (rotation) based on the electric power of the battery 110. An electric motor, such as a three-phase induction motor, is used as the power unit 111. Note that the power unit 111 may be referred to as, for example, a motor unit.

The control apparatus 112 is also referred to as, for example, a PDU (power drive unit) with the inclusion of a function of converting direct-current voltage into alternating-current voltage, or is also referred to as, for example, a PCU (power control unit) with the further inclusion of a function of converting alternating-current voltage into direct-current voltage, a function of converting a voltage level, and the like. For example, the control apparatus 112 controls the power unit 111 by converting the electric power of the battery 110 into a desired type and supplying the converted electric power to the power unit 111. Furthermore, the control apparatus 112 can also charge the battery 110 using the electric power that has been generated by regenerative braking of the power unit 111.

The battery 110 is arranged in the space between the pair of left and right main frames 105 in a plan view (from a viewpoint in the −Z direction), and is also arranged so as to overlap the main frames 105 in a side view (from a viewpoint in the ±Y direction). The battery 110 is supported either directly or indirectly with respect to the main frames 105; in the present embodiment, the battery 110 is fixed between the pair of left and right main frames 105 by a hanger 113 below the down frames 106.

The power unit 111 is arranged in the space between the pair of left and right main frames 105 in a plan view, and is, in the present embodiment, fixed via a predetermined mount unit 114 with respect to the pivot frames 108 in a lower portion of the vehicle body 100. In this way, the power unit 111 is fixed at a position where it can appropriately transmit motive power to the rear wheel 102, and this motive power is transmitted to the rear wheel 102 via, for example, a chain.

In the present embodiment, the control apparatus 112 is arranged below the power unit 111, and is covered by an under cover 115 so as to be protected from, for example, a flying stone attributed to the front wheel 101. Furthermore, the control apparatus 112 is also positioned below the battery 110, and is therefore arranged in proximity to both of the battery 110 and the power unit 111. Therefore, a wire unit (wire harness) that is used to supply the electric power of the battery 110 to the power unit 111 can be made relatively short.

Figure 3:
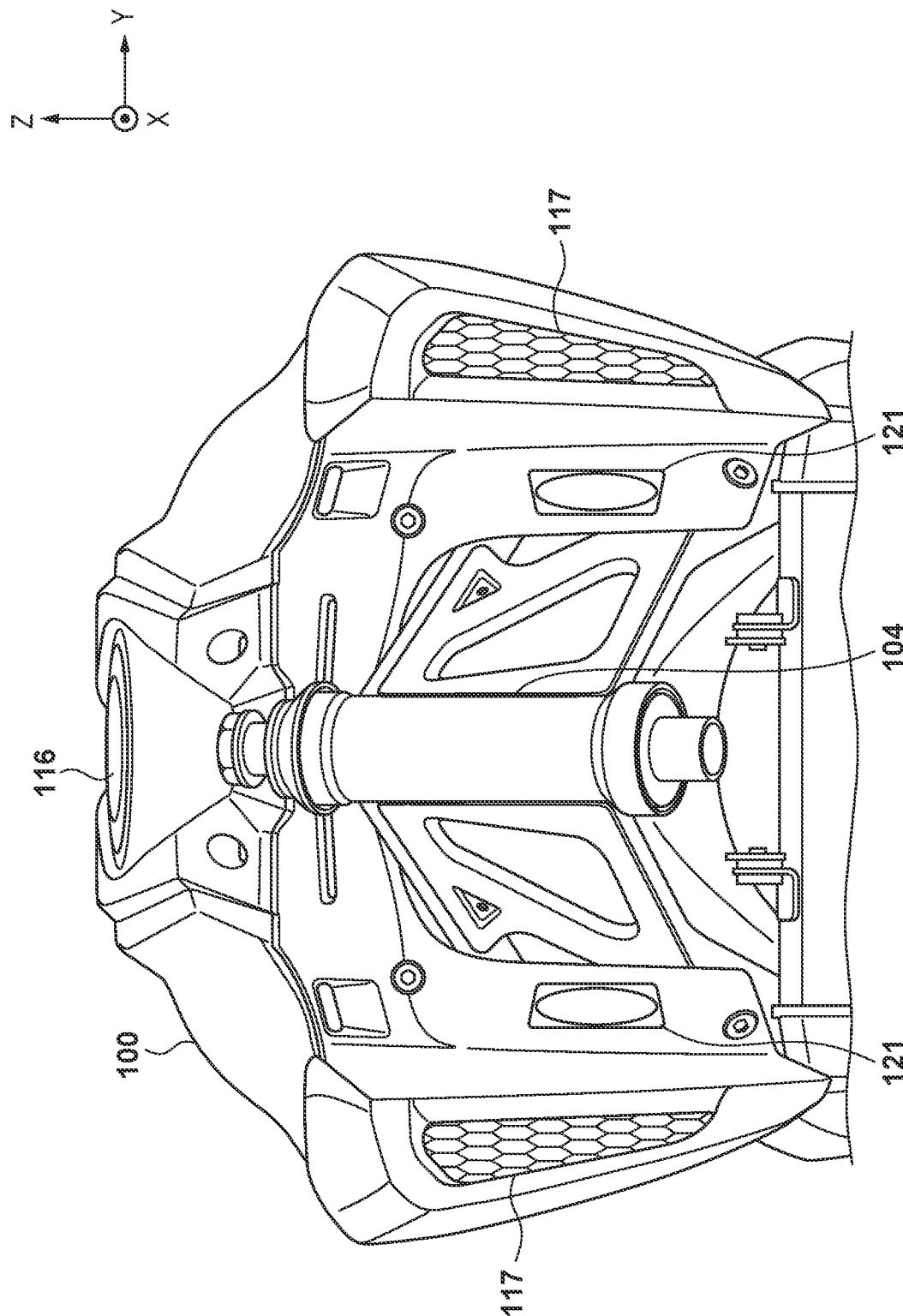
FIG. 3 is a front view for describing a vehicle body of a straddle-type electric vehicle.
Figure 4:
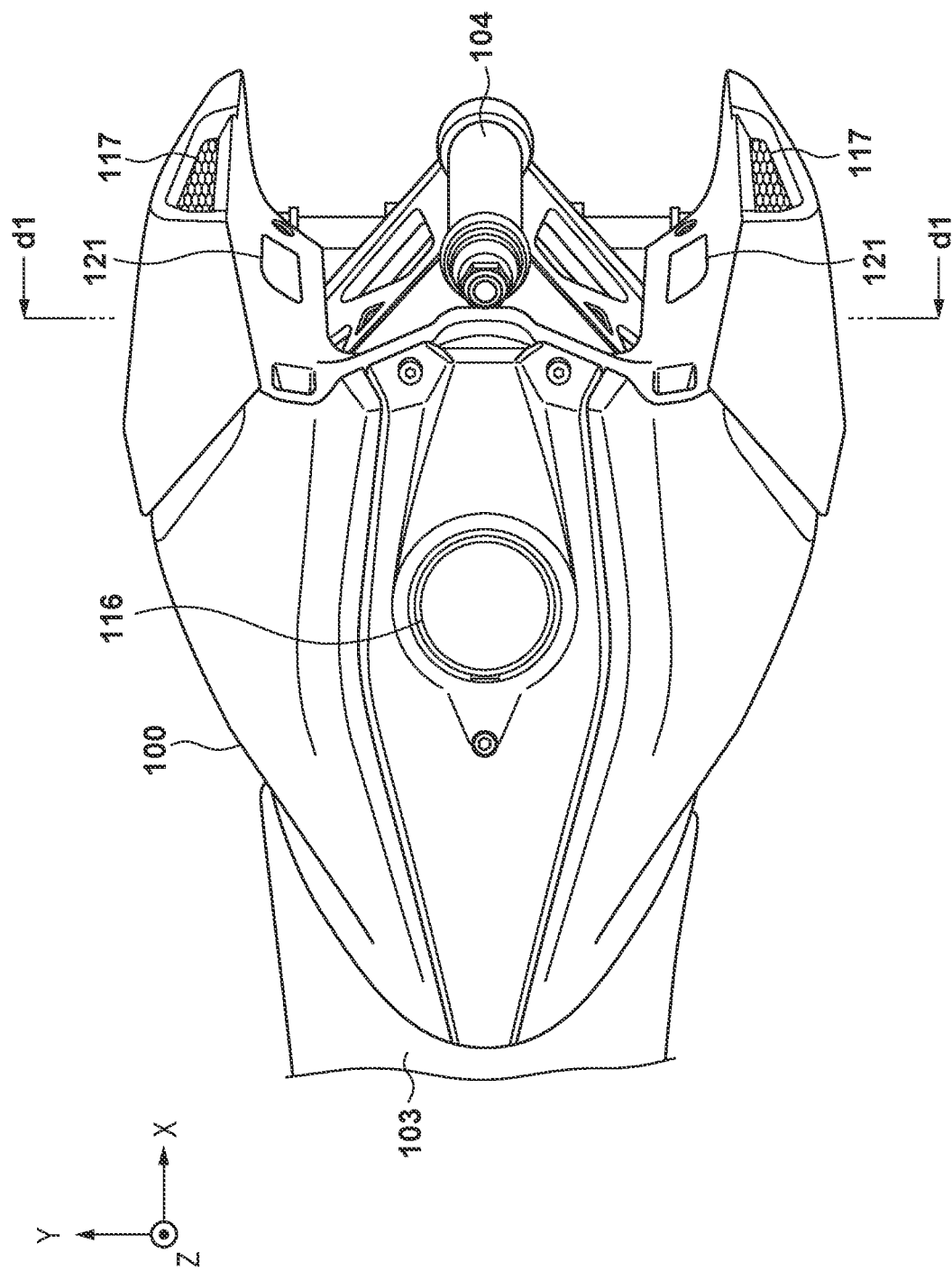
FIG. 4 is a top view for describing a vehicle body of a straddle-type electric vehicle.

FIG. 3 is a front view related to a part of the vehicle body 100. Also, FIG. 4 is a top view related to a part of the vehicle body 100. An upper surface of the vehicle body 100 is provided with a charging terminal unit 116, and the battery 110 can be charged by connecting a charging plug to this terminal unit 116. Also, the straddle-type electric vehicle 1 further includes a pair of left and right air intake ports 117, and the vehicle body 100 is formed so as to protrude frontward, with this pair of left and right air intake ports 117 formed on both sides of the head pipe 104. These air intake ports 117 allow later-described wind guiding ducts 118 to take in traveling wind. The air intake ports 117 may be provided with, for example, mesh sheets so as to prevent entrance of foreign substances (e.g., rain water, flying stones, and the like).

Figure 5:
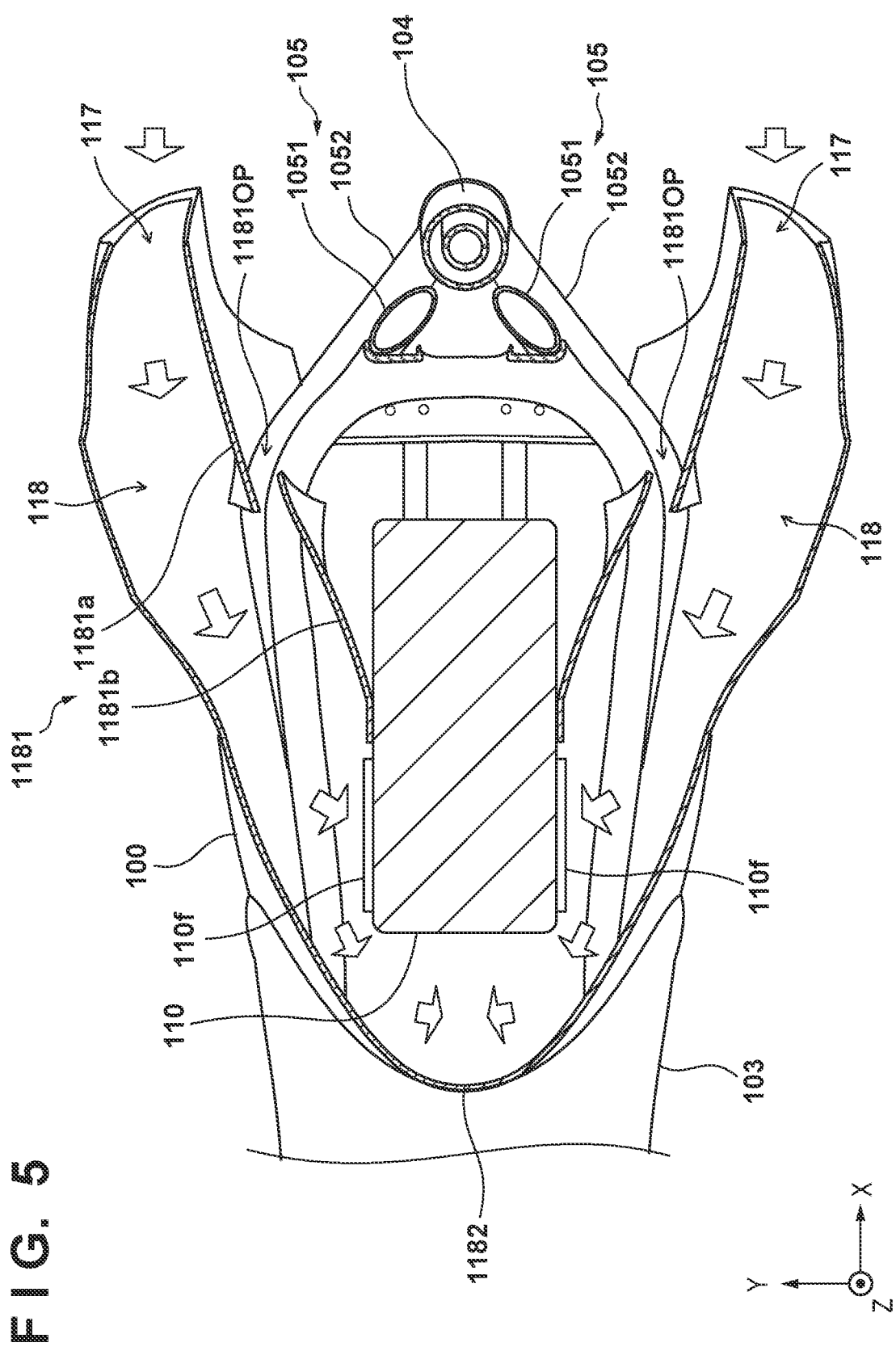
FIG. 5 is a cross-sectional view for describing a vehicle body of a straddle-type electric vehicle.

FIG. 5 is a cross-sectional view taken along the line d1-d1 of FIG. 4. The straddle-type electric vehicle 1 further includes a pair of left and right wind guiding ducts 118 within the vehicle body 100. The wind guiding ducts 118 are respectively provided relative to the aforementioned pair of left and right main frames 105, and guide traveling wind that has been taken in from the air intake ports 117 in a predetermined direction. In a plan view, the wind guiding ducts 118 are positioned more outward in the vehicle width direction than the pair of left and right main frames 105. Note that in order to facilitate the understanding, traveling wind is indicated by arrows in the figure.

Here, out of the interior wall that forms the wind guiding duct 118, an inner portion in the vehicle width direction (hereinafter, an inner interior wall) 1181 is provided so as to extend from the air intake port 117 to a side surface of the battery 110. The inner interior wall 1181 has an insertion hole 1181OP that allows the main frame 105 to be inserted therethrough. In the figure, out of the inner interior wall 1181, a portion that is anterior to the insertion hole 1181OP is depicted as an inner interior wall front portion 1181a, and a portion that is posterior to the insertion hole 1181OP is depicted as an inner interior wall rear portion 1181b. The inner interior wall front portion 1181a is curved in such a manner that it deflects toward the outer side of the vehicle body so as to be distanced from the main frame 105. The inner interior wall rear portion 1181b is curved in such a manner that it deflects toward the inner side of the vehicle body so as to be distanced from the main frame 105. Note that the inner interior wall 1181 may be formed by fitting together two or more members.

Figure 6:
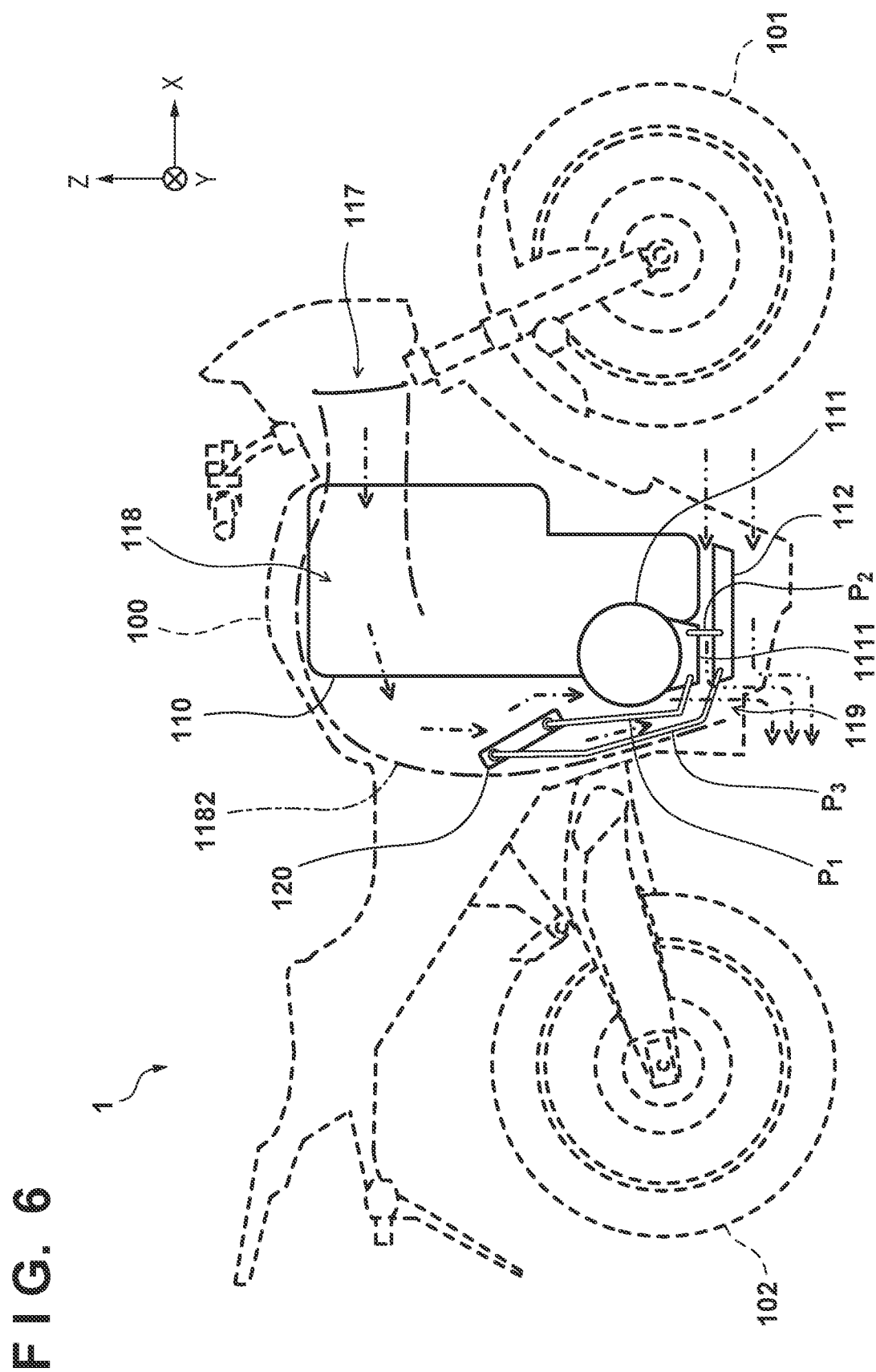
FIG. 6 is a left side view for describing an internal structure of a straddle-type electric vehicle.

FIG. 6 is a left side view of the straddle-type electric vehicle 1 for describing the wind guiding ducts 118. The wind guiding ducts 118 include a guide portion 1182 that is installed so as to extend in the up-and-down direction of the vehicle body in order to guide traveling wind to an area below the vehicle body. Due to this configuration, traveling wind that has been taken in from the air intake ports 117 passes the main frames 105, passes the sides of the battery 110, and then is guided by the guide portion 1182 behind the battery 110 toward the power unit 111 and to the area below the vehicle body. Note that as shown in FIG. 1, a side portion of the vehicle body is covered by a side cover 130, and the aforementioned traveling wind is guided to the area below the vehicle body without leaking from the wind guiding ducts 118.

The straddle-type electric vehicle 1 further includes an air outlet port 119 for emitting traveling wind. In the present embodiment, on a lower surface of the vehicle body of the straddle-type electric vehicle 1, the air outlet port 119 is provided in a lower end portion of the guide portion 1182 so as to be at the substantially same height as the control apparatus 112. In the present embodiment, the air outlet port 119 is formed so as to be surrounded by the power unit 111 that is positioned anterior thereto, and by the pivot frames 108 that are positioned on the sides thereof and posterior thereto. Due to this configuration, the air outlet port 119 is provided between the power unit 111 and the pivot frames 108 so as to be capable of emitting traveling wind to the area below the vehicle body. That is to say, as indicated by the arrows with the dash and single-dot lines in FIG. 6, traveling wind that has been taken in from the air intake ports 117 passes the main frames 105 and passes the sides of the battery 110 as guided by the wind guiding ducts 118, then is guided by the aforementioned guide portion 1182 toward the area below the vehicle body, and thereafter is emitted from this air outlet port 119. During travel of the straddle-type electric vehicle 1, negative pressure is generated between a travel surface, such as a road, and the vehicle body 100, and thus the aforementioned traveling wind is appropriately emitted to the area below the vehicle body without residing inside the wind guiding ducts 118.

Furthermore, according to the present embodiment, a housing of the power unit 111 itself forms a part of the air outlet port 119. Therefore, the aforementioned emitted traveling wind directly hits the power unit 111; this makes it possible to cool the housing of the power unit 111, and accordingly cool the inside of the power unit 111. Although the details will be described later, as indicated by the arrows with the dash and double-dot lines in FIG. 6, another traveling wind passes between and appropriately cools both of the power unit 111 and the control apparatus 112 by discharging heat that can be accumulated therebetween.

Also, the straddle-type electric vehicle 1 further includes a heat exchanger 120. The heat exchanger 120 is fixed or installed with respect to, for example, the main frames 105. In the present embodiment, the power unit 111 is configured to be coolable by a cooling medium circulating therein, and the heat exchanger 120 is connected to the power unit 111 via a pipe $P_1$ that forms a flow path for the cooling medium. In the present embodiment, a cooling medium reservoir unit 1111 for reserving the cooling median is mounted on a lower portion of the power unit 111, and the heat exchanger 120 is connected to the cooling medium reservoir unit 1111 via the pipe $P_1$.

Such liquids as water and oil are used as the aforementioned cooling median. When water is used as the cooling medium (in the case of so-called water cooling), for example, a heat sink and a heat pipe may be used as the heat exchanger 120 and the pipe $P_1$, respectively. In another example, a radiator may be used as the heat exchanger 120, and consequently a water pump, a reservoir tank, and the like may be further used. In this case, the pipe $P_1$ is also referred to as, for example, a water jacket. On the other hand, when oil is used as the cooling medium (in the case of so-called oil cooling), an oil cooler may be used as the heat exchanger 120, and consequently an oil pump and the like may be further used. In this case, the pipe $P_1$ is also referred to as, for example, an oil path, and the cooling medium reservoir unit 1111 is also referred to as, for example, an oil pan.

In the present embodiment, the heat exchanger 120 is positioned anterior to the guide portion 1182 and above the power unit 111 inside the wind guiding ducts 118, and during travel of the straddle-type electric vehicle 1, the heat exchanger 120 is hit by traveling wind that has been guided by the guide portion 1182. The cooling medium that absorbed heat in the power unit 111 reaches the heat exchanger 120 via the pipe $P_1$, then is cooled by the aforementioned traveling wind in this heat exchanger 120 (heat exchanging), and thereafter returns to the cooling medium reservoir unit 1111. As a result, the power unit 111 is cooled appropriately.

In the present embodiment, the cooling medium reservoir unit 1111 and the control apparatus 112 are connected via another pipe $P_2$ that forms a flow path for the cooling medium; this can cool the control apparatus 112 as well. Furthermore, the heat exchanger 120 and the control apparatus 112 are connected via another pipe $P_3$ that forms a flow path for the cooling medium; this can cool the cooling medium that absorbed heat in the control apparatus 112.

Referring to FIG. 5 again, in the present embodiment, the wind guiding ducts 118 are installed so as to extend inward in the vehicle width direction from the respective air intake ports 117, so that they are directed to the side surfaces of the battery 110. Furthermore, the battery 110 is supported so that traveling wind hits the side surfaces thereof, and heat dissipation fins 110*f* are provided on the side surfaces of the battery 110. A plurality of heat dissipation fins 110*f* are provided, and each of them is installed so as to extend in the horizontal direction with respect to the vehicle body 100. In this way, the battery 110 can be cooled when traveling wind passes the sides of the battery 110. The side surfaces of the battery 110, on which the heat dissipation fins 110*f* are provided, come into contact with the inner interior wall rear portions 1181*b* in a continuous manner; in other words, it can be said that the side surfaces of the battery 110 themselves form a part of the wind guiding ducts 118. Behind the battery 110, traveling wind that has passed one side of the battery 110 merges with traveling wind that has passed the other side of the battery 110, and is guided by the guide portion 1182 to the area below the vehicle body.

Furthermore, referring to FIG. 6, the wind guiding ducts 118 are formed so as to pass the side surfaces of the battery 110. In other words, the size of the battery 110 in the height direction has been increased so that an upper surface of the battery 110 is in proximity to upper walls of the wind guiding ducts 118 (they partially overlap in the present embodiment) in a side view. In the present embodiment, it is assumed that the upper surface of the battery 110 is positioned above the air intake ports 117. As a result, traveling wind that is guided by the wind guiding ducts 118 does not practically pass the upper surface of the battery 110.

Referring to FIG. 3 again, the straddle-type electric vehicle 1 further includes a pair of left and right blower fans 121. The blower fans 121 are arranged at the front of the vehicle body 100 in alignment with the air intake ports 117. During travel of the straddle-type electric vehicle 1, the air intake ports 117 allow the wind guiding ducts 118 to take in traveling wind. On the other hand, in a non-traveling state (e.g., while the vehicle is stopped due to traffic congestion and the like), as traveling wind is not generated, wind is created by driving the blower fans 121, thereby generating currents of air inside the wind guiding ducts 118. In this way, even in a non-traveling state, the battery 110, the power unit 111, and the control apparatus 112 can be cooled appropriately.

Furthermore, in order to allow wind to be created into both of the pair of left and right wind guiding ducts 118 in a non-traveling state, the aforementioned pair of left and right blower fans 121 is positioned more outward in the vehicle width direction than the head pipe 104. Here, the blower fans 121 are positioned more inward in the vehicle width direction than the air intake ports 117. While the amount of wind inside the wind guiding ducts 118 during travel is in conformity with the amount of traveling wind taken in by the air intake ports 117, the amount of wind created in a non-traveling state is in conformity with a drive force of the blower fans 121. Therefore, it is sufficient that the air intake ports 117 be positioned more outward in the vehicle width direction than the blower fans 121. Note that it is sufficient that the blower fans 121 be driven both during travel and in a non-traveling state; this makes it possible to also reduce air resistance during travel.

Figure 7:
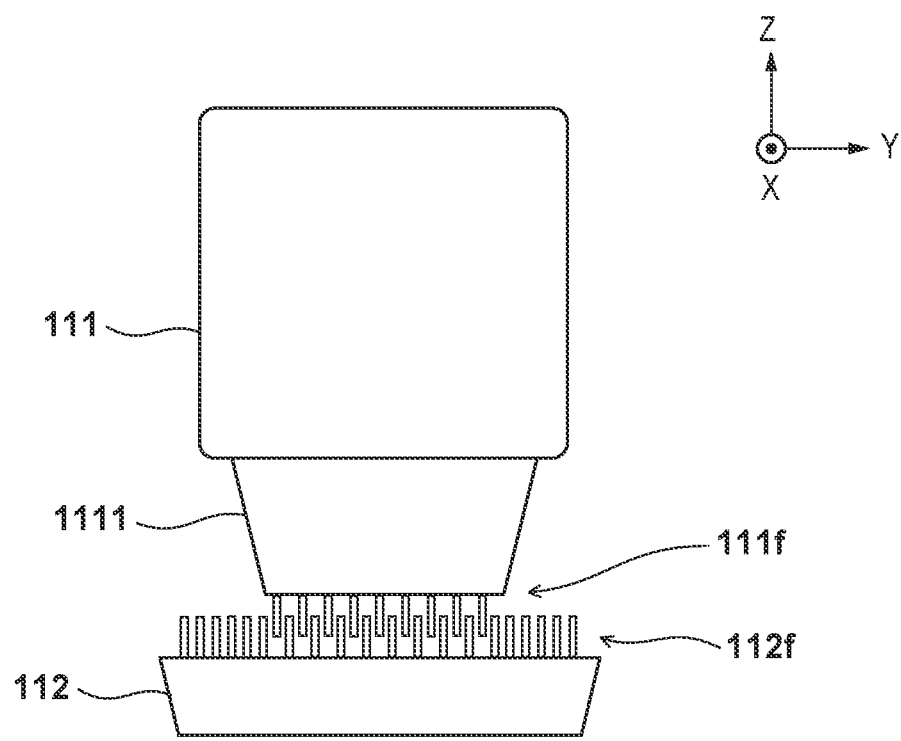
FIG. 7 is a diagram for describing a mode of arrangement of a power unit and a control apparatus.

FIG. 7 is a schematic view showing a mode of arrangement of the power unit 111 and the control apparatus 112. The control apparatus 112 is positioned in the space between the pair of left and right main frames 105 in a plan view, and is also arranged below, with a distance from, the power unit 111. In this way, traveling wind can pass between the power unit 111 and the control apparatus 112, and both of them can be cooled appropriately by discharging heat that can be accumulated therebetween.

A plurality of heat dissipation fins 111*f* are provided on a lower surface of the cooling medium reservoir unit 111*l* of the power unit 111, and a plurality of heat dissipation fins 112*f* are provided on an upper surface of the control apparatus 112. These heat dissipation fins 111*f* and 112*f* are disposed in a so-called lap arrangement, that is to say, the heat dissipation fins 111*f* and 112*f* are at least partially arranged alternately in the vehicle width direction in a front view, and arranged so as to overlap one another in a side view. Due to this mode of arrangement, the power unit 111 and the control apparatus 112 can be arranged relatively compactly in such a manner that both of them can be cooled appropriately.

Although not shown here, heat dissipation fins may be provided also on exposed surfaces of the power unit 111 inside the wind guiding ducts 118, for example, an upper surface and side surfaces of the power unit 111 across which traveling wind can pass. In this way, the power unit 111 can be cooled more appropriately. Moreover, heat dissipation fins may be further provided on a lower surface of the control apparatus 112 as well. In this way, the control apparatus 112 can be cooled more appropriately.

The present embodiment adopts a configuration in which the wind guiding ducts 118 guide traveling wind to the space between the pair of left and right main frames 105 in which the battery 110 and the power unit 111 are arranged in a plan view, and the wind guiding ducts 118 are positioned more outward in the vehicle width direction than the main frames 105. This configuration makes it possible to increase the size of the battery 110 in the vehicle width direction and increase the capacity of the battery 110. Therefore, the present embodiment can increase the travelable distance of the straddle-type electric vehicle 1.

Furthermore, in the present embodiment, as can be understood from FIG. 5, the air intake ports 117 for taking traveling wind into the wind guiding ducts 118 are positioned more outward in the vehicle width direction than the main frames 105. This can increase the amount of traveling wind that is taken in, and can improve the cooling performance that utilizes this traveling wind.

Furthermore, the positions of arrangement of the battery 110, the power unit 111, and the control apparatus 112 are not limited to the present example, and can be changed as appropriate depending on, for example, the intended use. For example, their positions of arrangement may be changed or adjusted depending on a magnitude relationship between the amount of heat generated by the power unit 111 and the amount of heat generated by the control apparatus 112.

Although the above has described examples of several preferred modes, the present invention is not limited to these examples and may be partially changed without departing from the intent of the present invention.

Furthermore, individual terms that have been described in the present specification are merely used for the purpose of explaining the present invention, and it goes without saying that the present invention is not limited to strict meanings of such terms and can also include their equivalents.

For example, a straddle-type vehicle refers to a type that a driver rides by straddling a vehicle body, and its concept also includes, in addition to a motorcycle (including a scooter-type vehicle), a three-wheeled vehicle (a vehicle having one front wheel and two rear wheels, or two front wheels and one rear wheel) and the like.

The features of the above-described embodiment are summarized as follows.

A first mode pertains to a straddle-type electric vehicle (e.g., 1), the straddle-type electric vehicle including: a pair of left and right main frames (e.g., 105) that is installed so as to extend in a longitudinal direction of a vehicle body; a seat rail (e.g., 107) that is installed so as to extend rearward from a rear portion of each of the pair of left and right main frames; a pivot frame (e.g., 108) that is installed so as to extend downward from a rear portion of each of the pair of left and right main frames; a swing arm (e.g., 109) that is supported by the pivot frame and by which a rear wheel (e.g., 102) is swingably supported; a battery (e.g., 110) that is arranged in a space between the pair of left and right main frames in a plan view; a power unit (e.g., 111) that is arranged in the space in a plan view and generates motive power based on electric power of the battery; and a wind guiding duct (e.g., 118) for guiding traveling wind to the space, the wind guiding duct being provided relative to each of the pair of left and right main frames, wherein the wind guiding duct is positioned more outward in a vehicle width direction than the pair of left and right main frames.

According to the first mode, as the size of the battery in the vehicle width direction can be increased, the capacity of the battery can be increased; as a result, the travelable distance of the straddle-type electric vehicle can be increased.

In a second mode, an air intake port (e.g., 117) for taking the traveling wind into the wind guiding duct is further included, the air intake port being provided relative to each of the pair of left and right main frames, wherein the air intake port is positioned more outward in the vehicle width direction than the pair of left and right main frames.

According to the second mode, the amount of traveling wind that is taken in can be increased, and the cooling performance that utilizes this traveling wind is improved.

In a third mode, the power unit is fixed with respect to the pivot frame in the space in a plan view.

According to the third mode, the power unit can be fixed at a position where it can appropriately transmit motive power to the wheel.

In a fourth mode, the wind guiding duct includes a guide portion (e.g., 1182) that is installed so as to extend in an up-and-down direction of the vehicle body so that the traveling wind passes the pair of left and right main frames and is guided to the power unit.

According to the fourth mode, traveling wind that has been taken in at an upper portion of the vehicle body can be appropriately guided to the power unit that is disposed in a lower portion of the vehicle body.

In a fifth mode, the power unit is configured to be coolable by a cooling medium circulating therein, the straddle-type electric vehicle further includes a heat exchanger e.g., 120) that is connected to the power unit via a first pipe (e.g., $P_1$) that forms a flow path for the cooling medium, and the heat exchanger is positioned anterior to the guide portion and above the power unit inside the wind guiding duct.

According to the fifth mode, traveling wind that has been guided by the guide portion hits the heat exchanger; as a result, the power unit can be cooled appropriately.

In a sixth mode, a pair of left and right air intake ports for taking the traveling wind into the wind guiding duct is further included, the air intake ports being respectively provided relative to the pair of left and right main frames, wherein the pair of left and right air intake ports is positioned more outward in the vehicle width direction than the pair of left and right main frames, and the wind guiding duct is installed so as to extend inward in the vehicle width direction from each air intake port, so that the wind guiding duct is directed to side surfaces of the battery.

According to the sixth mode, the traveling wind hits the side surfaces of the battery; as a result, the battery can be cooled appropriately.

In a seventh mode, the power unit is supported in front of the pivot frame, and the straddle-type electric vehicle further includes an air outlet port (e.g., 119) that is provided between the power unit and the pivot frame so as to be capable of emitting the traveling wind to an area below the vehicle body.

According to the seventh mode, traveling wind directly hits the power unit; as a result, a housing of the power unit, and consequently the inside of the power unit, can be cooled.

In an eighth mode, a control apparatus (e.g., 112) is further included that controls the power unit by supplying electric power of the battery to the power unit, wherein in the space in a plan view, the control apparatus is arranged below, with a distance from, the power unit so that the traveling wind passes between the control apparatus and the power unit.

According to the eighth mode, traveling wind also hits a lower surface of the power unit and an upper surface of the control apparatus; as a result, heat that can be accumulated therebetween can be discharged appropriately.

In a ninth mode, the power unit is configured to be coolable by a cooling medium circulating therein, a cooling medium reservoir unit (e.g., 1111) that reserves the cooling medium is mounted on a lower portion of the power unit, the straddle-type electric vehicle further includes a heat exchanger that is connected to the cooling medium reservoir unit via a first pipe (e.g., $P_1$) that forms a flow path for the cooling medium, the cooling medium reservoir unit and the control apparatus are connected via a second pipe (e.g., $P_2$) that forms a flow path for the cooling medium, and the heat exchanger and the control apparatus are connected via a third pipe (e.g., $P_3$) that forms a flow path for the cooling medium.

According to the ninth mode, the control apparatus can be cooled appropriately.

The present invention is not limited to the above embodiments and various changes and modifications can be made within the spirit and scope of the present invention. Therefore, to apprise the public of the scope of the present invention, the following claims are made.

The invention claimed is:

1. A straddle-type electric vehicle, comprising:
a pair of left and right main frames that is installed so as to extend in a longitudinal direction of a vehicle body;
a seat rail that is installed so as to extend rearward from a rear portion of each of the pair of left and right main frames;
a pivot frame that is installed so as to extend downward from a rear portion of each of the pair of left and right main frames;
a swing arm that is supported by the pivot frame and by which a rear wheel is swingably supported;
a battery that is arranged in a space between the pair of left and right main frames in a plan view;
a power unit that is arranged in the space in a plan view and generates motive power based on electric power of the battery; and
a wind guiding duct for guiding traveling wind to the space, the wind guiding duct being provided relative to each of the pair of left and right main frames,
wherein the wind guiding duct is positioned more outward in a vehicle width direction than the pair of left and right main frames, wherein
the power unit is supported in front of the pivot frame, and
the straddle-type electric vehicle further includes an air outlet port that is provided between the power unit and the pivot frame so as to be capable of emitting the traveling wind to an area below the vehicle body.

2. A straddle-type electric vehicle, comprising:
a pair of left and right main frames that is installed so as to extend in a longitudinal direction of a vehicle body;
a seat rail that is installed so as to extend rearward from a rear portion of each of the pair of left and right main frames;
a pivot frame that is installed so as to extend downward from a rear portion of each of the pair of left and right main frames;
a swing arm that is supported by the pivot frame and by which a rear wheel is swingably supported;
a battery that is arranged in a space between the pair of left and right main frames in a plan view;
a power unit that is arranged in the space in a plan view and generates motive power based on electric power of the battery; and
a wind guiding duct for guiding traveling wind to the space, the wind guiding duct being provided relative to each of the pair of left and right main frames,
wherein the wind guiding duct is positioned more outward in a vehicle width direction than the pair of left and right main frames, wherein
a control apparatus that controls the power unit by supplying electric power of the battery to the power unit, wherein in the space in a plan view, the control apparatus is arranged below, with a distance from, the power unit so that the traveling wind passes between the control apparatus and the power unit.

3. The straddle-type electric vehicle according to claim 2, wherein the power unit is configured to be coolable by a cooling medium circulating therein, a cooling medium reservoir unit that reserves the cooling medium is mounted on a lower portion of the power unit, the straddle-type electric vehicle further includes a heat exchanger that is connected to the cooling medium reservoir unit via a first pipe that forms a flow path for the cooling medium, the cooling medium reservoir unit and the control apparatus are connected via a second pipe that forms a flow path for the cooling medium, and the heat exchanger and the control apparatus are connected via a third pipe that forms a flow path for the cooling medium.

4. The straddle-type electric vehicle according to claim 1, wherein the power unit is fixed with respect to the pivot frame in the space in a plan view.

5. The straddle-type electric vehicle according to claim 4, wherein the wind guiding duct includes a guide portion that is installed so as to extend in an up-and-down direction of the vehicle body so that the traveling wind passes the pair of left and right main frames and is guided to the power unit.

6. The straddle-type electric vehicle according to claim 5, wherein the power unit is configured to be coolable by a cooling medium circulating therein, the straddle-type electric vehicle further includes a heat exchanger that is connected to the power unit via a first pipe that forms a flow path for the cooling medium, and the heat exchanger is positioned anterior to the guide portion and above the power unit inside the wind guiding duct.

7. The straddle-type electric vehicle according to claim 1, further comprising a pair of left and right air intake ports for taking the traveling wind into the wind guiding duct, the air intake ports being respectively provided relative to the pair of left and right main frames, wherein the pair of left and right air intake ports is positioned more outward in the vehicle width direction than the pair of left and right main frames, and the wind guiding duct is installed so as to extend inward in the vehicle width direction from each air intake port, so that the wind guiding duct is directed to side surfaces of the battery.

* * * * *